United States Patent
Allgaier et al.

(10) Patent No.: US 6,284,847 B1
(45) Date of Patent: Sep. 4, 2001

(54) PROCESS FOR THE PREPARATION OF HYDROPHOBIC/HYDROPHILE AB BLOCK COPOLYMERS

(75) Inventors: Jürgen Allgaier, Aachen; Lutz Willner; Dieter Richter, both of Jülich, all of (DE)

(73) Assignee: Forschungszentrum Julich GmbH (DE)

( * ) Notice: Subject to any disclaimer, the term of this patent is extended or adjusted under 35 U.S.C. 154(b) by 0 days.

(21) Appl. No.: 09/194,864

(22) PCT Filed: May 30, 1997

(86) PCT No.: PCT/DE97/01118

§ 371 Date: Dec. 4, 1998

§ 102(e) Date: Dec. 4, 1998

(87) PCT Pub. No.: WO97/46602

PCT Pub. Date: Dec. 11, 1997

(30) Foreign Application Priority Data

Jun. 5, 1996 (DE) .............................. 196 22 614
Aug. 27, 1996 (DE) .............................. 196 34 477

(51) Int. Cl.[7] .......................... C08F 240/00; C08F 8/00; C08F 32/00; C08F 132/00; C08F 283/10
(52) U.S. Cl. ................. 525/529; 525/327.9; 525/326.1; 525/328.9; 525/331.9; 525/332.1; 525/336
(58) Field of Search ............... 525/327.9, 326.1, 525/328.9, 331.9, 332.1, 366, 529

(56) References Cited

U.S. PATENT DOCUMENTS 4,254,238  3/1981  Foss et al. .

FOREIGN PATENT DOCUMENTS

2322079 C2  11/1973 (DE) .
WO 95/18164  7/1995 (WO) .

OTHER PUBLICATIONS

Yu et al., "Efficiency of the sec–Butyllithium/m–Diisopropenylbenzene Diadduct as an Anionic Polymerization Initiator in Apolar Solvents." *Macromolecules* 27, 5957–5963 (1994).

Le Deore et al., "Synthesis of Poly(ethylene oxide–diene–ethylene oxide) Triblock Copolymers. Characterization and Use as Solid Polymer Electrolytes." *Eur. Polym. J.* 27(11), 1297–1302 (1991).

Gervais et al., Structural Study of Polybutadiene–Poly(ethylene)oxide) Block Copolymers. Influence of the Nature of the Amorphous Block on the Refolding of the Poly(ethylene oxide) Chains. *Makromol. Chem.* 178, 1577–1593 (1977).

Morton et al., "Synthesis and Properties of Uniform Polyisoprene Networks. I. Synthesis and Characterization of α, ω–Dihydroxy–polyisoprene." *Rubber Chemistry and Technology* 49, 303–319 (1976).

Primary Examiner—Patrick D. Niland
(74) Attorney, Agent, or Firm—Connolly Bove Lodge & Hutz LLP

(57) ABSTRACT

The invention relates to a process for the preparation of hydrophobic-hydrophilic AB block copolymers wherein block A consists of the monomer unit a, which is conjugated diene, and block B consists of the monomer unit b, which is epoxide, and the invention also relates to the AB block copolymer synthesized by the preparation process, as well as to micellar systems made from the AB block copolymer. According to the invention, the AB block copolymer is synthesized in two steps, whereby the first step is the preparation of block A in a nonpolar solvent and the second step is the preparation of block B in a polar solvent.

24 Claims, 1 Drawing Sheet

PROCESS FOR THE PREPARATION OF HYDROPHOBIC/HYDROPHILE AB BLOCK COPOLYMERS

FIELD OF THE INVENTION

The invention relates to a process for the preparation of hydrophobic-hydrophilic AB block copolymers as well as to the AB block copolymer synthesized by the preparation process, and to micellar systems made from the AB block copolymer.

DESCRIPTION OF THE PRIOR ART

According to the state of the art, AB block copolymers are already known in which block A contains monomer units a, which are conjugated dienes, such as 1,3-dienes, and block B contains monomer units b, which are epoxides. Due to the incompatibility of blocks A and B, such polymers form microphase-separated systems as solids while, in most solvents, they form micellar structures (=opposite solubility behavior of blocks A and B in polar and nonpolar solvents).

Thus, the article by M. Gervais and B. Gallot in Makromol. Chem. [Macromolecular chemistry] 178, 1577 (1977) and Dutch patent no. 7,308,061 describe a synthesis of block copolymers having the structure AB and ABA, respectively, whereby A is polybutadiene or polyisoprene and B is polyethylene oxide. In this process, the synthesis takes place in a one-pot reaction by means of the successive addition of dienomer and of ethylene oxide to form mono-functional or bi-functional organo-sodium or organo-potassium initiators in tetrahydrofuran (THF) as the polar solvent.

German patent no. 23 22 079 describes the synthesis of an AB block copolymer wherein A is polybutadiene and B is polyethylene oxide. Here, too, the synthesis takes place in a one-pot reaction by means of the consecutive addition of the monomers butadiene and epoxide to the initiator sec-butyl lithium in benzene. Since this initiator is not capable of polymerizing ethylene oxide, after the addition of the epoxide, potassium tert-butanolate is added. As a result, 20% of the epoxide is polymerized. By means of a nickel catalyst, 95 % of the olefinic double bonds are subsequently hydrogenated.

U.S. Pat. No. 4,254,238 describes the synthesis of graft polymers. Here, the initial polymers are polydienes which are produced according to known methods. Through the reaction of the polydienes with diamines and organo-lithium compounds, polymerization-active centers are created on the initial polymer. The addition of epoxide and the subsequent acidification lead to the formation of functional OH groups on the polymer back-bone. OH groups are de-protonated by a reaction with potassium-organic reagents and, through the addition ethylene oxide, poly(ethylene oxide) blocks are grafted.

The syntheses described by M. Gervais and B. Gallot in Makromol. Chem. [Macro-molecular chemistry] 178, 1577 (1977) as well as in Dutch patent no. 7,308,061 exhibit a very high reactivity on the part of the agents, with the result that chain termination occurs or side chains are formed during the reaction. This gives rise to a non-uniform reaction product that contains molecules with molecule blocks A and/or B which have a non-uniform length and which are not linear but rather branched. Accordingly, these syntheses do not permit a control of the reaction in terms of the precise molecular composition of the target compound.

The synthesis described in German patent no. 23 22 079 yields a reaction mixture that contains lithium ions as well as potassium ions. In this mixture, only 20% of the epoxide is grafted onto the polydiene, as a result of which a large amount of unreacted product remains in the polymer, which then requires a complex purification procedure. This proportion of 20%, however, still contains homopolymer fractions, that is to say, polymer fractions which consist only of epoxide monomer fractions, so that, on the one hand, there is contamination with the homopolymer while, on the other hand, less than 20% is grafted onto block A. A considerably larger quantity of initial material has to be used than is actually converted into the desired product, so that this method entails a great deal of reprocessing and high costs, in addition to which it also creates disposal problems.

The reaction described in U.S. Pat. No. 4,254,238 takes place under very aggressive conditions and is consequently very uncontrolled. For example, chains are cleaved. In addition, lithiated tetramethyl ethylene diamine (TMEDA) and unreacted butyl lithium remain in the solution. Among the reaction products, there is also a fraction of homopoly (ethylene oxide), in other words, a polymer that consists exclusively of epoxide units (alkyleneoxy or ring-opened oxirane units). However, as is shown in the article titled "Synthesis and properties of uniform polyisoprene networks. I. Synthesis and characterization of $\alpha,\omega$-dihydroxy polyisoprene" in the journal Rubber Chemistry and Technology, volume 49, page 303 (1976), the reaction intermediate products, which only contain two —$CH_2$—$CH_2$—O side chains, precipitate out of the solution while forming complex compounds with metal ions. The result is a non-uniform product that contains a high proportion of unreacted components and by-products.

None of the methods cited is capable of yielding an AB block copolymer whose chemical properties are clearly defined in terms of its linearity and chain length and which is free of by-products. In Dutch patent no. 7,308,061, the blocks A, which are comprised of the monomeric diene, have a mixed structure made up of 1-4-polymer and 1-2-polymer or 3-4-polymer.

SUMMARY OF THE INVENTION

Therefore, the invention is based on the objective of creating a process for the preparation of AB block copolymers with the monomer units a, which are conjugated diene, and the monomer units b, which are epoxide, a process that yields a product whose structure is clearly defined, whereby the chain lengths of the blocks A and B can be selected at will and can be adjusted by means of the reaction conditions, whereby no branching of the product in the form of side effects occurs and whereby no by-products, such as homopolymers A or B, are formed. Moreover, the blocks A can have a very high proportion of 1,4-polymer. The effort involved for the subsequent purification procedure can be minimal. The process is expected to be expensive.

According to this invention, hydrophobic-hydrophilic AB block copolymers are prepared by producing block A in a first reaction step in a non-polar solvent and block B in a second reaction step in a polar solvent. The resulting AB block copolymer is also an aspect of this invention, as are micellar structures prepared from the copolymer.

According to this invention, hydrophobic-hydrophilic AB block copolymers are prepared by producing block A in a first reaction step in a non-polymer solvent and block B in a second reaction step in a polar solvent. The resulting AB block copolymer is also an aspect of this invention, as are micellar structures prepared from the copolymer.

With the process according to the invention, it is now possible to prepare an AB block copolymer whose blocks A and B have clearly defined chain lengths, also with respect to each other. The product does not exhibit any branching caused by side chains. Now, molecules can be tailor-made as desired so as to meet the required specifications in terms of chain length, molecular weight, polarity proportion and viscosity. The conversion of the initial materials is quantitative, and a product can be made whose block A contains approximately 95% of 1,4-addition product. Depending on the requirements, it is no longer necessary to add equivalent amounts of sodium or potassium organyl for the polymerization of the epoxide—or of the OH groups—which is brought about as a result of the addition of one unit of epoxide to block A. Nevertheless, homogenous growth is attained.

The preparation process according to the invention for AB block copolymers will be described in greater detail below.

BRIEF DESCRIPTION OF THE DRAWINGS

The three figures of the drawing serve to illustrate the micellar structures made from the AB block copolymers.

The following is shown.

DETAILED DESCRIPTION

Figure 1:
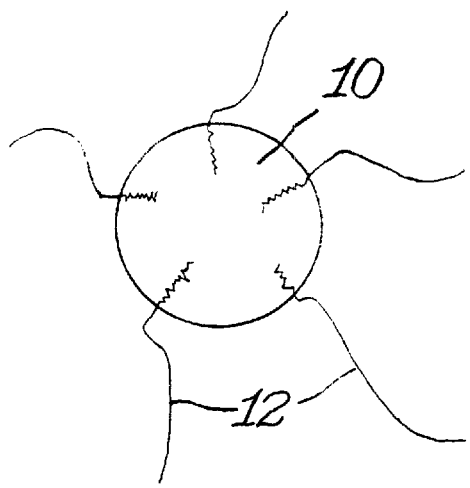
FIG. 1 is a plan view, greatly enlarged, of a spherical micellar structure of the AB block coploymer in a solvent (ellipsoidal form optional, but not shown), wherein the solvent is not shown.
Figure 2:
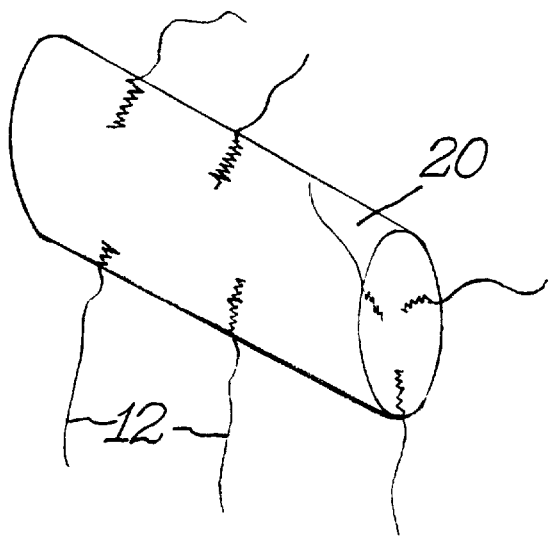
FIG. 2 is a perspective view, greatly enlarged, with parts broken away, of a cylindrical micellar structure of the AB block copolymer in a solvent (not shown)
Figure 3:
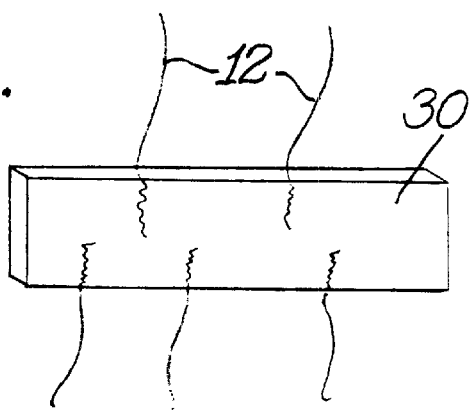
FIG. 3 is a perspective view, greatly enlarged, with parts broken away, of a lamellar micellar structure of the AB block copolymer in a solvent (not shown)

The micelles shown in FIGS. 1, 2, and 3 are designated 10, 20, and 30, respectively. Viewed microscopically, all three micelles can be seen to have relatively solvent-compatible elements 12.

All of the structures depicted in FIGS. 1 through 3 are attainable in nonpolar solvents (in this case, block A is dissolved) as well as in polar solvents (in this case, block B is dissolved).

Table 1 shows the test results cited in the examples.

The following abbreviations are used in the table:

PI=OH-terminal-functionalized polyisoprene

PEP=OH-terminal-functionalized poly(ethylene propylene)

PEO=polyethylene oxide block in the copolymer $^a$=determined by means of GPC $^b$=determined by means of NMR from $M_n$ PEP and from the composition $M_n$=numerical mean molecular weight $M_w$=weighted average molecular weight GPC=gel-permeation chromatography The preparation of the AB block copolymer according to the invention takes place in a two-stage synthesis wherein, in the first step, familiar methods are employed to anionically polymerize conjugated diene in a nonpolar solvent using an initiator. A lithium organyl is employed as the initiator. Within the scope of the invention, an AB block copolymer refers to a polymer with at least one block A and at least another block B. In addition to the structure AB, the structure BAB is also a structure according to the invention. In this context, block A consists of a monomer unit a or of a mixture of the monomer units a, a', a", etc. together. Analogously, block B contains monomer units b or a mixture b, b', b", etc. Generally speaking, the monomers a are conjugated dienes, especially 1,3 dienes. Preference is given to 1,3-dienes which only have short side chains, although, depending on the product desired, it is also possible to employ dienes which either have longer side chains or in which the diene structure is not in a terminal arrangement but rather in a chain. Furthermore, isolated double bonds can also be incorporated into the molecule. Examples are the following compounds: 1,3-butadiene, iso-prene, 2,3-dimethyl butadiene, 1,3-pentadiene, 1,3-dimethyl butadiene, 2,4-hexadiene. Phenyl groups or their alkyl derivatives can also be in the place of the methyl groups. The decisive factor in the selection of the monomers a is that they have to form a nonpolar polymer block A.

The monomer b of block B is an epoxide. In the simplest embodiment, the epoxide can be ethylene oxide, although epoxides provided with substituents can also be used in the synthesis. The substituents can be alkyl or aryl substituents.

The decisive factor in the selection of the monomers b is that they have to form a polymer block B that is water-soluble. Thus, other monomers that ensure this result can also be employed.

However, when it comes to the monomers a, a', a" and b, b', b", the invention is not limited to the examples cited.

Lithium organyls such as sec-butyl lithium or tert-butyl lithium can be employed as the initiators for the anionic polymerization of block A. In this context, in view of the solubility of the organyl, preference is given to the use of lithium ion as the counterion. However, a decisive factor is that the organyl ion has to allow the reactive agent to be soluble in the nonpolar solvent that is used in the first reaction step. Over the further course of the reaction, the use of bifunctional lithium organyls, such as a 2:1 adduct from sec-butyl lithium and 1,3-bis(1-phenyl ethenyl)benzene (MDDPE), leads to AB block copolymers having the structure BAB. The nonpolarity of the solvent allows the reaction course to be controlled in terms of the linearity of the product.

Within the scope of the invention, the term nonpolar solvents refers to a nonpolar aromatic or aliphatic hydrocarbon.

Examples of this are benzene, c-hexane, iso-pentane, in other words, branched alkanes as well as alkane.

Once the monomer a has been polymerized in the nonpolar solvent by the organyl in order to form a block A, a monomer unit b is then grafted onto the still active chain ends. Since lithium initiators are used, no further polymerization occurs. After the reaction is ended by means of an acid, one obtains the polymer A(OH), which is functionalized with alcoholic OH groups. Subsequently, a familiar method can be employed to hydrogenate A-OH to form the polyolefin A(H)—OH. The terminal OH groups are not attacked by this.

A-OH or A(H)—OH can be precipitated in order to separate lithium salts from the polymer A-OH or A(H)—OH. This has the advantage that $Li^+$ ions do not interfere with the subsequent reaction.

After the intermediate product A(H)—OH or A-OH has precipitated, it can be isolated and heated up in order to remove impurities. The protic impurities, such as water, alcohols and acids, which are detrimental for the further processing, are removed by repeatedly dissolving the polymers A-OH or A(H)—OH in benzene and by subsequently distilling off or evaporating the benzene under vacuum conditions. Instead of benzene, it is also possible to employ another solvent, such as THF or toluene. In this context, the solvent should dissolve the polymers A-OH or A(H)—OH and remove volatile protic impurities. Due to its high thermal stability, the polyolefin A(H)—OH can be heated to a temperature ranging from 100° C. to 120° C. [212° F. to 248° F.] between the individual distillation cycles under vacuum conditions, which increases the effectiveness of the purification process. Depending on the product property, the heating process can also reach higher temperatures such as 150° C. to 180° C. [302° F. to 356° F.]. As an alternative, the intermediate product A(H)—OH can be freed of detrimental impurities by means of subsequent heating under vacuum conditions. This eliminates the need to repeatedly dissolve the polymer in the solvent and then having to distill off the solvent.

In the second step, the A-OH or A(H)—OH is dissolved in dry THF or in another polar solvent without allowing contact with air during the procedure, under the reaction conditions commonly employed for anionic polymerization. Examples of other suitable polar solvents are ethers, such as diethyl ether or tert-amines. However, the selection of solvents is not restricted to the examples given here.

Potassium-organic or sodium-organic reagents, such as cumyl potassium, are employed to de-protonize the terminal OH groups of the compounds A(H)—OH or A-OH and to convert them into the macroinitiators A-OK, A- ONa or A(H)—ONa, respectively. Preference, however, is given to potassium compounds. The addition of the epoxide causes grafting of block B and the reaction is subsequently ended with the addition of acid. However, any metal organyl that ensures the solubility of the organyl and of the intermediate reaction products and that allow the polymerization of the epoxide can be employed. Examples of these are benzyl potassium, flurenyl potassium and naphthyl potassium. Metal hydrides, such as NaH or KH, or else the pure alkali metals, such as sodium or potassium, can be employed as initiators.

As an alternative to the hydrogenation after the first step, the hydrogenation can also follow the polymerization of block B.

The synthesis of the AB block copolymers according to the invention can be carried out under inert gas or in a vacuum, for instance, at $10^{-4}$ mbar.

EXAMPLES

Example 1

Polyisoprene-poly(ethylene oxide) block copolymer: 22.00 grains of isoprene, which had previously been dried for 14 hours at room temperature over solvent-free dibutyl magnesium and then for 20 minutes at −10° C. [14° F.] over solvent-free n-butyl lithium, are condensed under high-vacuum conditions in a 500-ml glass reactor. Then 300 ml of cyclohexane which had been dried over n-butyl lithium are condensed in addition. Then 1.00 mmol of sec-butyl lithium in the form of a solution in cyclohexane is added from an ampoule attached to the reactor. After 24 hours, 0.72 grams of ethylene oxide that has been de-gassed and dried over calcium hydride powder are added via another ampoule. Following an additional 14 hours, the polymerization is stopped by the addition of acetic acid. The OH-terminal-functionalized polyisoprene is isolated by means of precipitation in methanol.

A total of 8.17 grams of polymer is dissolved in 60 ml of benzene dried over n-butyl lithium. The solvent is distilled off under high-vacuum conditions and the polymer is stirred for 20 hours under high-vacuum conditions. The entire procedure is repeated another two times. Subsequently, without allowing any contact with air, the polymer is dissolved in 60 ml of THF dried over a mixture of sodium-potassium alloy and benzophenone. Under high-vacuum conditions, a 0.05-molar solution of cumyl potassium in THF is added to the polymer solution until the polymer solution acquires a light orange color. Under high-vacuum conditions, 5.89 grams of ethylene oxide that has been degassed and purified over calcium hydride as well as 150 ml of THF are added to the polymer solution. The further polymerization is continued for 3 days at 50° C. [122° F.] and subsequently ended by the addition of acetic acid. The block copolymer is purified by means of precipitation in cold acetone at a temperature of −20° C. [−4° F.].

The AB block copolymer forms water-soluble micelles in the order of magnitude of a few microns.

Example 2

Poly(ethylene propylene) poly(ethylene oxide) block copolymer: 7.2 grams of OH-terminal-functionalized polyisoprene from Example 1 are dissolved in 600 ml of heptane and hydrogenated by means of a palladium/barium sulfate catalyst at 90° C. [194° F.] and at 40 bar of hydrogen pressure. The OH-terminal-functionalized poly(ethylene propylene) obtained is purified by means of precipitation in methanol and dried in a high vacuum at 100° C. [212° F] for three days under agitation. The poly(ethylene oxide) block is polymerized as described in Example 1, using 5.51 grams of OH-terminal-functionalized poly(ethylene propylene) and 2.75 grams of ethylene oxide. The purification of the product is also carried out as described in Example 1.

Example 3

Poly(ethylene propylene)poly(ethylene oxide) block copolymer: OH-terminal-functionalized polyisoprene is prepared as in Example 1, using 29.08 grams of isoprene, 800 ml of benzene, 6.53 mmol of tert-butyl lithium and 2.38 grams of ethylene oxide. The polyisoprene is hydrogenated as in Example 2. The reaction of 1.28 grams of OH-terminal-functionalized poly(ethylene propylene) with 4.04 grams of ethylene oxide takes place as in Example 2.

In decane, the AB block copolymer forms micelles.

Example 4

Poly(ethylene propylene)poly(ethylene oxide) block copolymer: 3.64 grams of OH-terminal-functionalized poly (ethylene propylene) are reacted with 1.18 grams of ethylene oxide as in Example 2. The product is purified by means of precipitation in water.

Example 5

Polyisoprene poly(ethylene oxide) block copolymer: 50 mol-% of the quantity of cumyl potassium that is necessary for a complete de-protonation of the polymeric OH groups is added to 2.14 grams of OH-terminal-functionalized polyisoprene from Example 3 under the same conditions as in Example 1. The number of OH groups is calculated on the basis of the amount and molecular weight of the OH-terminal-functionalized polyisoprene. The reaction with 6.75 grams of ethylene oxide takes place as in Example 1, except that the reaction time is 7 days.

The block copolymers from Examples 1 through 5 are examined by means of GPC for the presence of polyisoprene-, poly(ethylene propylene)- and polyethylene oxide-homopolymers. No detectable amounts of homopolymer were found in any case (detection limit lower than 1%).

The characterization of the molecular weights of the polymers from Examples 1 through 5 is compiled in Table 1.

TABLE 1

| | $M_n$ (PI or PEP) (osmosis) | $M_w/M_n$ (PI or PEP) (GPC) | $M_n$ (copolymer) (osmosis) | $M_w/M_n$ (copolymer) (GPC) | Composition (NMR) |
|---|---|---|---|---|---|
| Example 1 | 21,500[a] | 1.02 | 40,400 | 1.02 | 41% PEO |
| Example 2 | 23,000[a] | 1.02 | 33,300 | 1.02 | 32% PEO |
| Example 3 | 4480 | 1.03 | 19,200 | 1.02 | 75% PEO |
| Example 4 | 4480 | 1.03 | 5970[b] | 1.04 | 20% PEO |
| Example 5 | 4280 | 1.03 | 20,600 | 1.03 | 76% PEO |

Abbreviations used in Table 1:
PI= OH-terminal-functionalized polyisoprene
PEP= OH-terminal-functionalized poly(ethylene propylene)
PEO= poly(ethylene oxide) block in the copolymer
[a]= determined by means of GPC
[b]= determined by means of NMR from $M_n$ PEP and from the composition For the first time, it is now possible to prepare AB block copolymers comprising a polydiene block A and at least one epoxide (alkyleneoxy) block B as hemically and molecularly defined materials. By changing the reaction conditions between the polymerization steps 1 and 2, both monomers can be quantitatively polymerized without side reactions. As a result, neither polymeric by-products nor unreacted monomers are found in the product. None of the processes listed in the state of the art is capable of producing these block copolymers without by-products.

Since the quantity ratio of the monomers a and b can be freely selected, varying the block molecular weights of A and B allows a precise adjustment of the properties of the AB block copolymer such as, for instance, its usability as a detergent. This was not possible with the processes known so far.

The use of aliphatic or aromatic hydrocarbons as the solvent for the polymerization of the diene block A allows the latter to be obtained with a maximum proportion of 1,4-microstructure, that is to say, the anionic polymerization is overwhelmingly—up to about 95%—in the form of a 1,4-addition. This translates into a low glass transition temperature for block A, which is desirable or even necessary for the proccessability, for example, during extrusion as well as for certain applications. The glass transition temperatures achieved are −80° C. [−112° F.] at 95% 1,4-polymer in the case of 1,3-butadiene polymer, and −70° C. [−94° F.] at 95% 1,4-polymer in the case of isoprene polymer, in block A. The methods cited in the state of the art, which employ polar solvents, such as THF (tetrahydrofuran), yield polymers with higher glass transition temperatures for block A.

The hydrogenated AB block copolymers are resistant to oxidation and more thermally stable than the products which are only slightly or not at all hydrogenated.

This has a clearly positive impact on the preparation, processing and application. In addition, as long as a hydrogenated polybutadiene having a high proportion of 1,4-polymer was used as the initial product for the second reaction step, the hydrogenated AB block copolymers exhibit a high degree of crystallization and are insoluble in most solvents or else only soluble at high temperatures (for example, in aromatic and aliphatic solvents). The products according to the invention are soluble in water or in alkanes, depending on the relative chain length of blocks A and B.

The AB block copolymers according to the invention can be employed in the preparation of emulsions and microemulsions. They have blocks A that are soluble in aliphatic alkanes. An exception to this, however, is the hydrogenated 1,3-butadiene having a high fraction of 1,4-polymer.

In solvents and solvent mixtures, the AB block copolymers according to the invention form micellar structures which can be shaped in different ways. The critical micelle concentration (CMC) of the polymeric amphiphiles is smaller than that of low-molecular amphiphiles. As solids, the micellar structures form microphase-separated systems.

The examples given in FIGS. 1 to 3 are merely a selection of possible micellar structures but these examples should not be construed as a limitation.

The AB block copolymers and micellar systems according to the invention can be employed as emulsifiers in the medical, pharmaceutical and food-product sectors.

What is claimed is:

1. Process for the preparation of hydrophobic-hydrophilic AB-block copolymer by anionic polymerization, wherein:
    monomer units a of block A comprise a conjugated diene and monomer units b of block B comprise an epoxide, wherein block A is formed in a first reaction step in a non-polar solvent, and block B is formed in a second reaction step in a polar solvent, and, to conclude the first reaction step,
    1. the epoxide and
    2. a proton-donator
    are introduced and the polymerization of block B proceeds with the aid of an alkali metal initiator other than a lithium initiator
    and wherein the copolymer produced does not exhibit any branching caused by side chains.

2. Process according to claim 1, wherein monomer units A are polymerized with the aid of a lithium organyl as initiator.

3. Process according to claim 1, wherein the alkali metal initiator for the polymerization of monomer units b to obtain block B is an alkali metal organyl, alkali metal hydride, or alkali metal.

4. Process according to claim 3, wherein:
    in the first reaction step, monomer units a are polymerized with the aid of a lithium initiator;
    any double bonds remaining in block A are optionally at least partially hydrogenated;
    after the introduction of the proton-donator or after the partial hydrogenation of said double bonds, the resulting block A is dissolved at least once in a solvent, and the solvent is distilled off, at a temperature in the range of room temperature to 120° C.; block A is prepared at a temperature that does not fall below room temperature; and
    block B is prepared at a temperature in the range of room temperature to 50° C.

5. Process according to claim 4, wherein:
    the lithium initiator of the first reaction step is a bifunctional initiator;
    said double bonds are fully hydrogenated after the addition of the proton-donator;
    the solvent in which the resulting block A is dissolved comprises benzene; and
    the distillation of said solvent is carried out at room temperature, under vacuum.

6. Process according to claim 1, wherein any double bonds remaining in the resulting block A are optionally hydrogenated; and
    after the introduction of the proton-donator, or after the hydrogenation step, the resulting block A is separated off and subjected to a vacuum.

7. Process according to claim 6, wherein block A is subjected to a vacuum at a temperature ranging from room temperature to 120° C.

8. Process according to claim 1, wherein the resulting block A consists essentially of a single polymerized conjugated diene monomer, or the resulting block A comprises a plurality of polymerized diene monomers.

9. Process according to claim 1, wherein the resulting block B consists essentially of a single repeating alkyleneoxy unit, or block B comprises a plurality of repeating alkyleneoxy units.

10. Process according to claim 8, wherein the resulting block A comprises a plurality of polymerized diene monomers a and a', and monomer a is in higher concentration in block A than monomer a'.

11. Process according to claim 9, wherein the resulting block B comprises a plurality of alkyleneoxy units b and b', and unit b is in greater concentration in block B than unit b'.

12. Process according to claim 1, wherein block A has a chain length of 10 to 2000 monomer units.

13. Process according to claim 1, wherein block B has a chain length of 10 to 2000 monomer units.

14. Process according to claim 1, wherein block A and block B have chain lengths of 20 to 500 monomer units.

15. Process according to claim 1, wherein block A of the AB-block copolymer comprises conjugated 1,3-diene which has undergone a major amount of 1,4-addition and has substantially the glass transition temperature of a 1,4-polymer.

16. An AB-block copolymer prepared by the process of claim 1.

17. Composition comprising micelles, wherein said micelles comprise at least one AB-block copolymer of claim 16.

18. A composition according to claim 17, said composition further comprising a solvent which dissolves block A but not block B or which dissolves block B but not block A.

19. A composition comprising micelles, wherein said micelles comprise a mixture comprising a plurality of AB-block copolymers prepared according to claim 1.

20. Process for the preparation of a hydrophobic-hydrophilic AB-block copolymer, comprising:

anionically polymerizing monomer units a', wherein units a' comprise conjugated diene, in a first reaction step in a non-polar solvent which dissolves the conjugated diene, to obtain block A with still-active chain ends;

in a subsequent reaction step, grafting onto the still-active chain ends of block A a monomer unit b', said unit b' being an epoxide, and treating said block A with a proton donor to obtain a functionalized polymer A having at least one OH group;

separating the resulting functionalized polymer A from said non-polar solvent, and dissolving the functionalized polymer A in a polar solvent which also dissolves an alkali metal organyl; and adding an alkali metal organyl, alkali metal hydride, or elemental alkali metal to said polar solvent, to initiate the formation of block B and the grafting of block B onto block A to obtain the hydrophobic-hydrophilic AB-block copolymer.

21. The process as claimed in claim 1, wherein the block A contains approximately 95% of 1,4-addition product.

22. The process as claimed in claim 1, wherein the block A contains approximately 95% of 1,4-addition product.

23. Process for the preparation of a hydrophobic-hydrophilic block copolymer having a block A that is soluble in non-polar solvent and a block B that is soluble in polar solvent, comprising:

block A is produced in a first reaction step in a non-polar solvent, separating the resulting functionalized polymer A from said non-polar solvent and dissolving the functionalized polymer A in a polar solvent and block B is produced in a second reaction step in said polar solvent.

24. Process for the preparation of a hydrophobic-hydrophilic block copolymer having a block A that is soluble in non-polar solvent and a block B that is soluble in polar solvent, comprising:

block A is produced in a first reaction step in a non-polar solvent, and block B is produced in a second reaction step in a polar solvent and wherein the copolymer produced does not exhibit any branching caused by side chains.

* * * * *